United States Patent [19]
Zielinski et al.

[11] Patent Number: 5,104,253
[45] Date of Patent: Apr. 14, 1992

[54] CABLE ASSEMBLY, LOCK THEREFOR

[75] Inventors: Thomas E. Zielinski, Saint Clair; Paul W. Geyer, Rochester, both of Mich.

[73] Assignee: Chrysler Corporation, Highland Park, Mich.

[21] Appl. No.: 723,667

[22] Filed: Jun. 27, 1991

Related U.S. Application Data

[63] Continuation of Ser. No. 534,011, Jun. 6, 1990, abandoned, which is a continuation-in-part of Ser. No. 383,507, Jul. 24, 1989, abandoned.

[51] Int. Cl.⁵ .................. F16B 21/06; H01R 13/52
[52] U.S. Cl. .................... 403/329; 403/361; 439/271; 439/354
[58] Field of Search .............. 403/49, 326, 329, 361, 403/368, 374, 375; 439/353, 354, 271-276

[56] References Cited

U.S. PATENT DOCUMENTS

| | | | |
|---|---|---|---|
| 3,409,858 | 11/1968 | Krehbiel | 439/354 |
| 3,611,261 | 10/1971 | Gregory | 439/353 |
| 3,671,921 | 6/1972 | Baker, III et al. | 439/353 |
| 4,373,766 | 2/1983 | Johnston | 439/354 X |
| 4,602,838 | 7/1986 | Davies et al. | 439/354 |
| 4,637,674 | 1/1987 | Kobler | 439/271 X |
| 4,936,791 | 6/1990 | Zielinski et al. | 439/271 |

FOREIGN PATENT DOCUMENTS 2447105 8/1980 France ................. 439/353

*Primary Examiner*—Peter M. Cuomo
*Attorney, Agent, or Firm*—Wendell K. Fredericks

[57] ABSTRACT

Locking a cable socket to a cable plug in a cable assembly is affected by integrally molding a lock assembly to the socket and plug housings. A pair of overstress brackets of the socket housing prevent a resilient latch of the lock assembly from breaking if excessive force is used to move the latch from a catch post mounted on the plug housing. Also, the overstressed brackets are formed in a manner that permits a single molding operation when forming the socket housing.

5 Claims, 2 Drawing Sheets

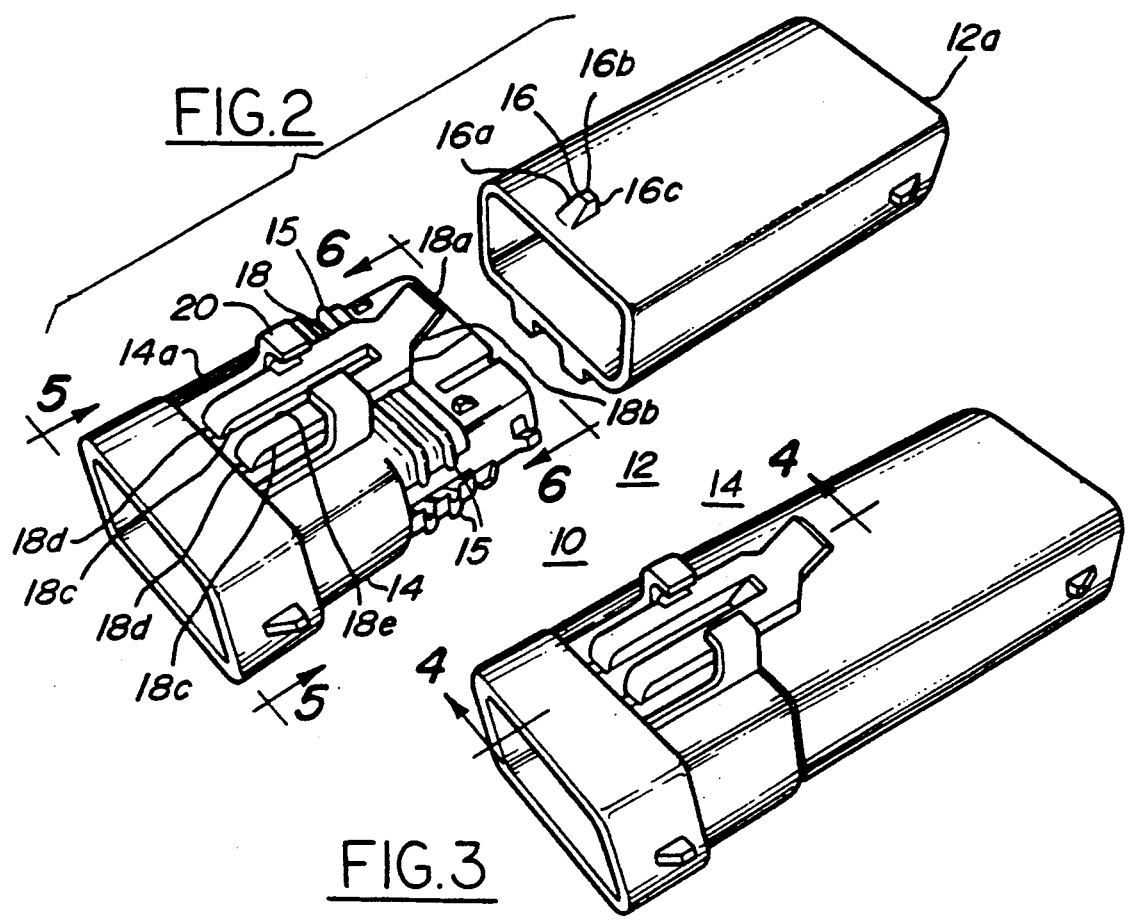
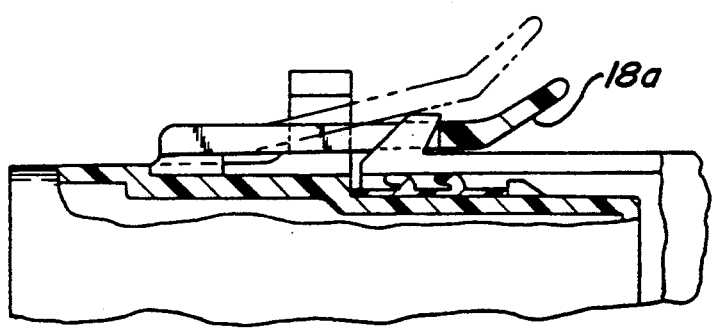
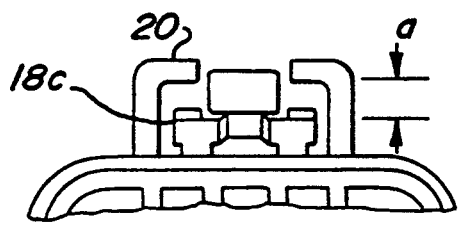 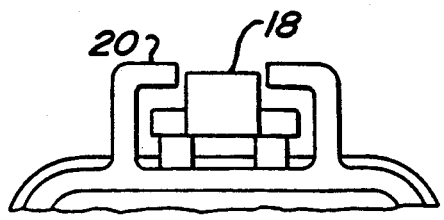

CABLE ASSEMBLY, LOCK THEREFOR

This is a continuation of U.S. Pat. application Ser. No. 07/534,011 filed June 6, 1990, abandoned which is a continuation-in-part of Ser. No. 07/383,507 filed July 24, 1990, abandoned.

BACKGROUND OF THE INVENTION

1. Field of the Invention

This invention relates to locks for cable assemblies and, more particularly in a preferred embodiment, to a lock for holding a socket and a mating plug in interfitting engagement. The socket includes a catch which cooperatively interact with a resilient latch in a novel manner that permits easy assembly and disassembly of the plug from the socket.

2. Description of the Prior Art

Prior art assemblies include means for locking plugs in connector housings to prevent disengagement due to vibration or some other environmental influence during use.

Several forms of locking mechanisms have been derived for locking a plug to a socket housing. Such mechanisms have included a keeper that interacts with a resilient latch that is mounted, at one end, from a pivot point. When the plug which carries the keeper is inserted into the socket, the keeper forces the latch upward to allow the keeper to pass over the front edge and enter a slot in the latch. With the keeper in the slot, the plug is physically locked to the socket and cannot be removed until the latch is raised in such a manner to allow the keeper to be removed from the slot.

A problem with such a lock is that a tool of some sort is generally needed to raise the latch about its pivot point and then another means must be used in conjunction with raising the latch to pull the plug from the socket such that the keeper is removed from the slot in the latch. Many times in trying to perform this operation, the latch is stressed to the point that it breaks at its pivot. One means for preventing this over stressing the latch at its pivot point is to provide an overstress bracket which mounts about the latch and to the connector housing.

To form such assembly using conventional injection molding techniques, the latch must be ultrasonically welded to the connector housing separate from molding the connector housing and the overstress bracket because of the inconvenience of forming the pivot weld on the housing and still allow the latch to flex about the pivot point within the overstress bracket.

Another prior art lock system includes a similar assembly except for the fact that the overstress bracket for retaining the latch is formed in two parts which extend substantially over the latch. The problem with such an arrangement of the overstress bracket is that the latch can pivot about its pivot point but generally it makes contact with the overstress bracket in such a manner that it distorts the two part bracket making it difficult for manually unlocking the lock and removing the plug from the socket.

To provide a lock for use in locking a plug to a socket, it is desirable to provide a latch that can be readily operated by the person who is either assembling or disassembling the cable assembly without the need of tools. Also, it is desirable to provide a lock mechanism that can be manufactured as an integral part of the connector housing and yet can add enhancing features to the overall performance of the cable assembly.

To obtain the above-mentioned desiderata, a search for various other means to enhance the locking characteristics of the lock mechanism was initiated. This search resulted in improved lock mechanism of the present invention.

SUMMARY OF THE INVENTION

The present invention concerns cable assemblies having in-line sockets for connecting the cable or wire to components when the cable or wires are terminated by in-line plugs and sockets. The sockets and plugs both have housings with terminal receiving channels disposed therewithin for receiving female and male pin terminals respectively.

The present invention overcomes the above-noted problem in the prior art by providing a low profile lock mechanism which may be easily manufactured and is of simple; construction. The lock mechanism may be readily manufactured by the injection molding of the latch and a pair of overstressed brackets disposed about the latch on a top surface of the plug housing. A catch for the lock is also integrally injected molded with the housing for the connector in alignment for interfitting with the latch.

BRIEF DESCRIPTION OF THE DRAWING

FIG. 2 is a perspective view of an in-line plug and an in-line socket of a cable assembly with a lock mechanism constructed in accordance with the present invention;

FIG. 3 is a perspective view of the plug interfitted in the socket and the catch mounted on the connector in lock engagement with the latch mounted on the plug;

FIG. 4 is a cross-sectional view of the plug and socket and lock mechanism of FIG. 3 taken along the lines 4—4 and illustrative in particular of the unlock feature of the lock mechanism;

FIG. 5 is a rear view of the plug illustrative of the manner in which the latch and the overstressed brackets are integrally attached to the housing of the plug; and FIG. 6 is a front view of the socket illustrative of a tongue of the latch used for opening and locking the lock mechanism.

DESCRIPTION OF A PREFERRED EMBODIMENT

Figure 1A:
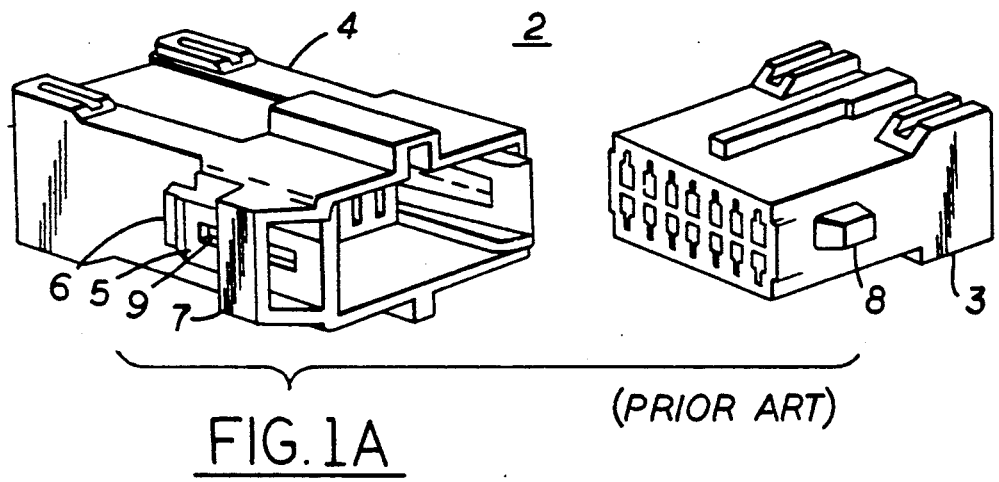
FIGS. 1A and 1B are perspective views of prior art plug and in-line connectors of a cable assembly with lock mechanisms that include overstress brackets.
Figure 1B:
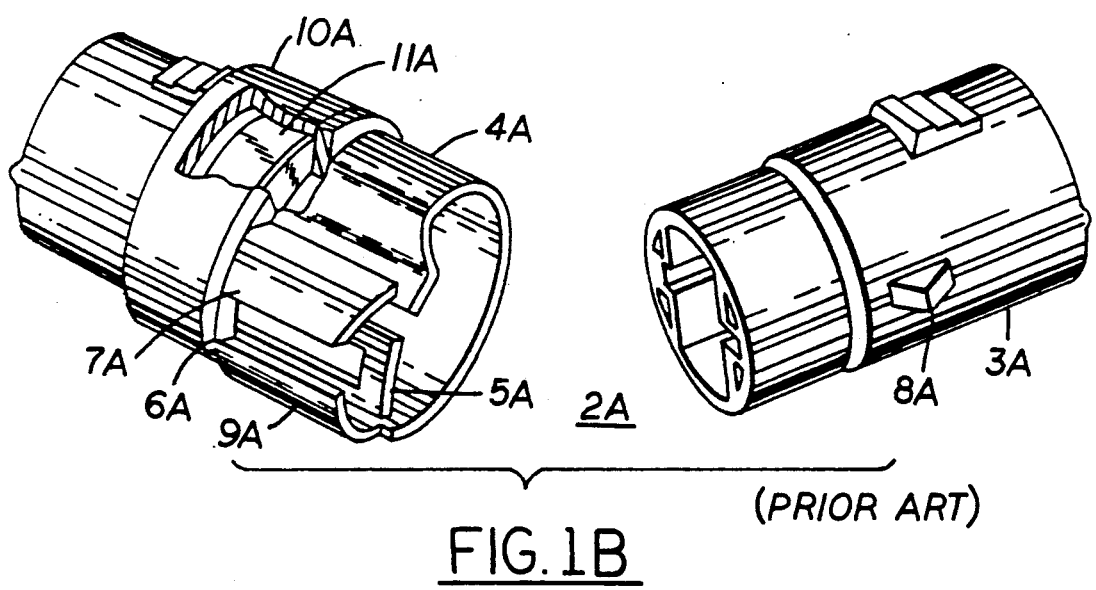

Referring now to FIGS. 1A and 1B, there is shown in FIG. 1A a prior art connector assembly 2 that includes a plug 3 and socket 4. A resilient material latch 5 is fixedly mounted at one end to a pivot point 6 on one side of the housing of socket 4. An overstress bracket 7 encompasses latch 5 to prevent over-flexing latch 5 when opening the lock. A catch 8 is fixedly mounted to a side of the housing of plug 3 in-line with an aperture 9 of latch 5.

This lock is formed by at least two separate manufacturing operations. The latch 5 and the overstress bracket 7 have to be formed separately from the housing of socket 4. The separate operation consumes time and increases the cost of the connector assembly.

The assembly is not easily removable by hand and is not for sealed applications.

Another prior art connector assembly 2A useful for sealed applications comprised of plug 3A and socket 4A is shown in FIG. 1B. A resilient material latch 5A is fixedly mounted at one end to a pivot point 6A. A two-part rectangular shaped, overstress bracket 7A is mounted about the latch 5A. A catch 8A is fixedly mounted to the housing of plug 3A.

The housing of socket 4A along with the two-part overstress bracket 7A and the latch 5A usually require sonic welding techniques rather than molding processes. Sonic welding is required because a hollow chamber 10A of socket 4A contains an environmental seal 11A. To create this hollow chamber for seal 11A and, in the same operation, form the latch 5A with an aperture 9A and the over-stressed bracket 7A using molding techniques would be virtually impossible to achieve. Also, when using this prior art lock, the latch 5A makes contact with the overstress bracket 7A in such a manner resulting in distorting the shape of both the latch and bracket.

Referring to FIGS. 2-6, there is shown in FIG. 2 an in-line plug 12 and an in-line socket 14 of a cable assembly 10 suitable for use with an environment seal.

Plug 12 includes a molded housing 12a, and a catch post 16 of a lock mechanism 15. Housing 12a is comprised of an injected molding dielectric material section with the catch post 16 integrally molded to a top surface at an in-board end of the housing.

Socket 14 includes a molded housing 14a that contains a front region for mounting a circular environmental seal 15, a resilient material latch 18 integrally molded to a top surface of the plug housing 14a, and a pair of over-stressed brackets 20 also integrally molded to the housing 14a. A gap exists between the brackets so that the injection molding operation may integrally form the latch 18, bracket 20 and the housing 14a. This procedure is in contrast to that required to form the prior art socket 4a of FIG. 1B.

The environmental seal 15 of FIG. 2 is disclosed in a co-pending application, Ser. No. 07/383,508 of T. Zielinski, et al. filed Jul. 24, 1989, now U.S. Pat. No. 4,936,791.

Latch 18 has an inclined tongue member 18a which acts as a handle for the latch, a transverse bar 18b connected to one end of tongue 18a, and a pair of resilient arms 18c fixedly mounted to housing 14a at pivots 18d at one end and fixedly mounted to the transverse bar 18b at another end to form a latch slot 18e for receiving the catch post 16 mounted on connector 12. When socket 14 is mated with plug 12, the transverse bar 18b slides across an inclined front face of catch post 16a and over a lateral top 16b and then snaps downward across a tapered back face 16c into a locked position, best shown in FIG. 4.

As illustrated in FIG. 4, when unlocking the lock mechanism 18, tongue 18a is pressed upward in order to remove the slot 18e from catch post 16 and then as socket 14 is withdrawn from plug 12, the transverse bar 18b glides across the top surface 16b of catch 16 and then down the incline face 16a completing the unlocking of lock mechanism 15.

In the process of unlocking latch 18 from catch post 16, the over-stress bracket 20 comes in contact with the resilient arms 18c of latch 18 restricting movement of latch 18 about the pivot point 18d so as to prevent the latch from being flexed to a point where the resilient arms 18c would tear away from the socket housing 14a.

The distance "a" traveled by the resilient arms 18c when the latch 18 is opened is illustrated in FIG. 5 which shows the space between the resilient arms when in a locked position and the undersurface of the overstressed brackets 20.

FIG. 6 is illustrative of the tongue 18a which can be manipulated with one finger to unlock the latch 18 from catch post 16 when removing socket 14 from plug 12.

While the present invention has been disclosed in connection with the preferred embodiment thereof, it should be understood that there may be other embodiments which fall within the spirit and scope of the invention and that the invention is susceptible to modification, variation and change without departing from the proper scope or fair meaning of the following claims.

What is claimed is:

1. An environmentally sealed cable assembly lock mechanism for connecting two separate cable circuits comprising:

(a) a circular environmental seal having a hole therethrough;

(b) a socket housing comprised of a one-piece molded section having a rearwardly spaced cavity region adapted to encase one of the two separate cable circuits and a frontwardly spaced cavity region which protrudes through the hole of said seal and having an outer surface adapted for mounting said seal thereon;

(c) a plug housing comprised of a one-piece molded section having a rearwardly spaced cavity region adapted to encase a second of the two separate cable circuits, said plug housing having a frontwardly spaced cavity region having an interior surface which, when said socket housing mates with said plug housing, said first and second separate cable circuits connect to form a completed circuit while said environmental seal forms a sealed region between said outer surface of said frontwardly spaced cavity region of said socket and said interior surface of said frontwardly spaced cavity region of said plug housing sealing the cable circuits from the environment;

(d) a lock mechanism comprising:

(1) a latch means integrally molded to a top surface of said rearwardly spaced cavity region of said socket housing, including a tongue means for unlocking the lock mechanism, a transverse bar means with one end connected to one end of said tongue means, and a pair of spaced-apart resilient arm members with one end of said pair of arm members integrally molded to said transverse bar means and with another end of said pair of arms integrally molded to a pair of pivot points on said top surface of said socket housing, said transverse bar means and said spaced-apart arm members forming a slotted region of said latch means, and a pair of overstress brackets also integrally molded to said top surface of said socket housing for restricting upward lateral and angular movement of said resilient arm members of said latch means prior to and after connecting said socket housing to said plug housing;

(2) a catch post means mounted to a top surface of said rear spaced cavity region of said plug housing having an inclined face for guiding said transverse bar means of said latch means over a top surface of said catch post means that permits said transfer bar means to snap downward across a tapered backface into a positive locked position, said tapered backface of said catch post means restraining upward movement of said transverse bar means.

2. A lock mechanism as recited in claim 1 wherein said pair of overstress brackets has a gap extending between an end of each bracket of said pair of overstress brackets which facilitate integral molding of said latch means and said overstress brackets to said socket housing as a unitary structure.

3. A method of constructing a lock mechanism for a cable assembly containing an environmental seal comprising the steps of:
(a) forming a plug housing comprising a substantially tubular structure;
(b) providing a catch post at an inboard end of said plug housing during the forming of the plug housing;
(c) providing a circular environmental seal;
(d) forming a socket housing which can be interfittingly engaged with said plug housing and to contain said environmental seal within the interfitting engagement;
(e) providing a latch means for positive locking including a tongue means for thumb releasing of the lock mechanism, a transverse bar means with one end connected to one end of said tongue means, and a pair of spaced-apart resilient arm members, with one end of said pair of arm members integrally molded to said transverse bar means and with another end of said pair of arms integrally molded to a pair of pivot points on a top surface of said socket housing, said transverse bar means and said spaced-apart arm members forming a slotted region of said latch means; and
(f) providing a pair of overstress brackets to said socket housing for restricting upward, downward, lateral and angular movement of said latch means to prevent said latch means from being flexed to a point where said resilient arm members would tear away from said socket housing prior to locking and during a process of unlocking said socket housing latch means from said plug housing catch post.

4. A method as recited in claim 3 wherein such step of forming said plug housing and said socket housing as unitary structure is accomplished by a single manufacture injection molding operation of a suitable plastic.

5. A method as recited in claim 4 wherein such step of securing said catch post to said plug housing and said latch member and bracket members to said socket housing as unitary structure is also accomplished by a single manufacture injection molding operation of a suitable plastic.

* * * * *